June 15, 1926.
P. A. TRAPP
1,589,268
SPUDDING GEAR FOR WELL DRILLING RIGS
Filed August 30, 1923
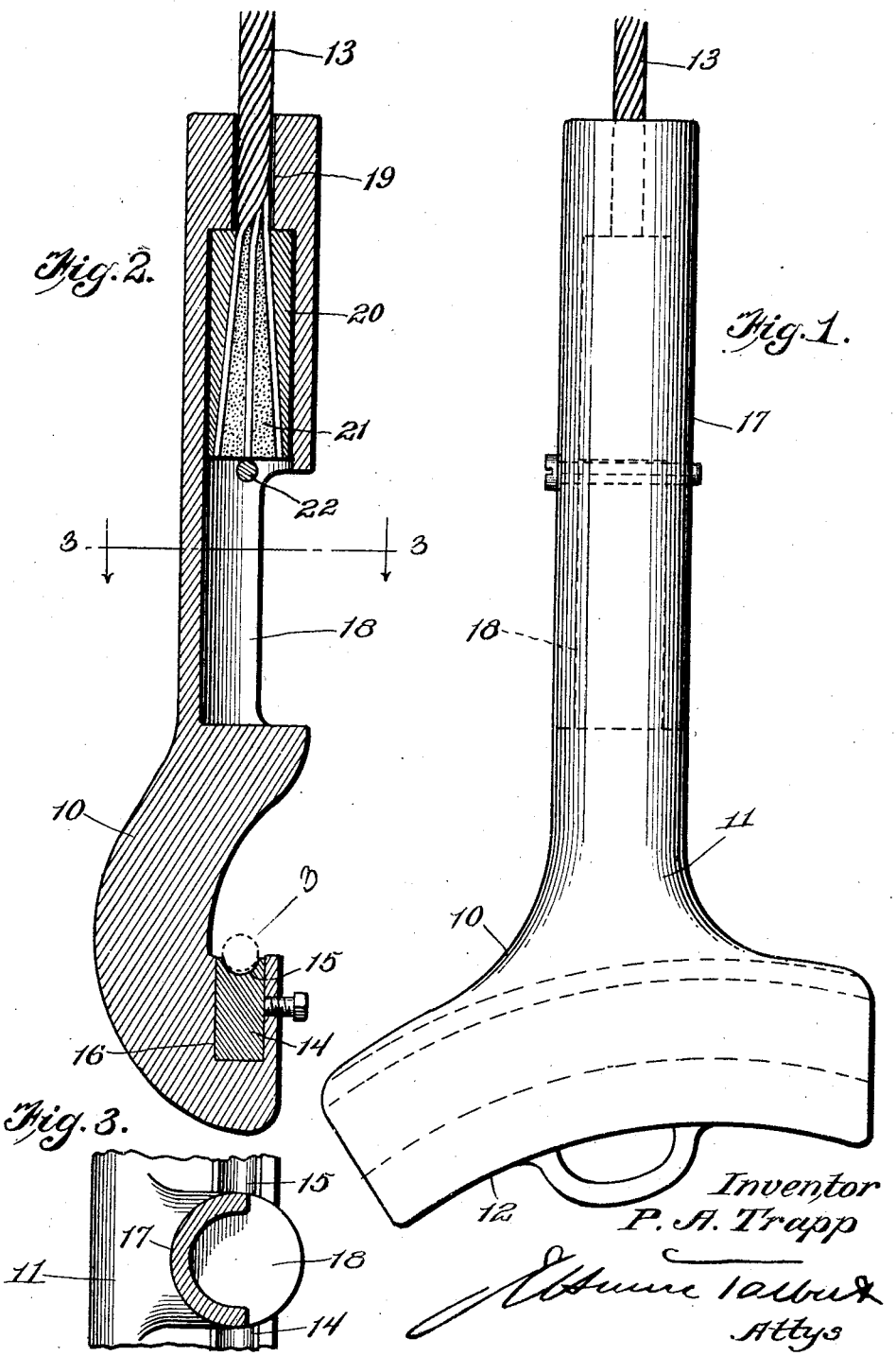
Inventor
P. A. Trapp Patented June 15, 1926.

1,589,268

UNITED STATES PATENT OFFICE.

PATRICK A. TRAPP, OF TULSA, OKLAHOMA.

SPUDDING GEAR FOR WELL-DRILLING RIGS.

Application filed August 30, 1923. Serial No. 660,186.

The purpose of the invention is to provide a device for connecting the spudding and jerk lines of a well drilling apparatus, so that an arcuate or rounded seat may be provided for the spudding line, with the line of pull of the jerk line disposed directly across said seat at its center.

With this purpose in view, the invention consists in a construction and combination of parts of which a preferred embodiment is illustrated in the accompanying drawings, wherein:

Figure 1 is a side elevational view of a spudding shoe constructed in accordance with the invention.

Figure 2 is a vertical sectional view taken centrally of the structure of Figure 1.

Figure 3 is a transverse sectional view on the plane indicated by the line 3—3 of Figure 2.

The spudding line or cable 3 engages with a spudding shoe 10 which comprises a body 11 which terminates at one end in an arcuate portion 12. This arcuate portion has a lining of soft metal which is likewise arcuate corresponding to the curve of the spudding line or cable. The body of the shoe is curved and the center of the soft lining of metal is in alinement with the swivel connection between the shoe and the jerk line or cable 13. The soft metal lining 14 has its arcuate edge provided with a groove 15 with which the spudding line or cable 3 engages. The lining seats in a recess 16 and may be replaced readily, when worn, with a new lining.

The body 11 of the spudding shoe is formed with a shank 17 which is provided with an elongated opening 18. Opposite walls of this opening are curved or arcuate concentric with the center of the jerk line or cable. The arcuate or curved walls extend only half the length of the opening 18 while the other half thereof has its opposite walls correspondingly straight longitudinally and transversely and which are parallel. The end of the shank 17 has a relatively small opening 19 through which the jerk line or cable 13 passes.

The jerk line or cable 13 is swiveled to the shank of the spudding shoe. This swiveled connection is made by first passing the line or cable 13 through the opening 19, after which it is pulled through a substantial distance and the wires at the extremity of the line or cable are spread. However, before spreading the wires at the extremity of the cable, a conical sleeve 20 is fitted upon the cable, whereby its larger end is designed to register or assume a position flush with the terminals of the wires.

The sleeve 20 is disposed in its proper position on the extremity of the line or cable until the margin of the larger end thereof is flush with the terminals of the wires of the cable. The several wires of the extremity of the cable are then spread against the tapering wall of the interior of the sleeve, after which a substantial deposit of Babbitt metal 21 is deposited on the interior of the sleeve, thereby binding the wires together in a spread condition and against the tapering wall of the sleeve. In this way, the terminal of the cable or jerk line is anchored in the sleeve. The cable or jerk line is then arranged so that the sleeve will assume a position between the arcuate or curved walls at one end of the opening in the shank. The smaller end of the sleeve engages the shoulder at one end of the opening 19, thereby swivelly connecting the cable or jerk line to the shank of the spudding shoe.

To maintain the sleeve in position with its smaller end adjacent the shoulder, a pin 22 is extended transversely of the shank relatively close to the larger end of the sleeve to retain the sleeve in position between the transversely curved walls of the opening in the shank. However, the pin is not disposed too close to the larger end of the sleeve, such as would permit too much longitudinal movement of the sleeve. The main purpose of the pin is to prevent the sleeved end of the cable from assuming a position between the parallel walls of the elongated opening in the shank. The pin is headed, the head engaging one of the exterior faces of the shank while its other end is threaded in the opposite wall. Obviously, the jerk line or cable 13 will have freedom of movement revolubly in case the cable or jerk line twists.

The invention having been set forth, what is claimed is:

A spudding shoe for connecting spudding and jerk lines comprising a body having connections at one end with a jerk line, the other end of the body being provided with a curved offset having an arcuate portion and a groove concentric with the arcuate portion, the groove being angular in cross section, the center of the operative connections with the jerk line passing through the center of the groove, and an arcuate soft metal bearing conforming to and mounted in said groove and having an arcuate seat semi-circular in cross section for the reception of the spudding line, the center of said operative connections with the jerk line passing through the center of the seat, and means operatively mounted in the wall of the arcuate portion and engaging the soft metal bearing to hold the bearing in position in the groove.

In testimony whereof he affixes his signature.

PATRICK A. TRAPP.